United States Patent [19]

Ito et al.

[11] Patent Number: 4,679,809
[45] Date of Patent: Jul. 14, 1987

[54] STEERING CONTROL SYSTEM FOR WHEELED VEHICLE

[75] Inventors: Ken Ito; Naohiko Inoue, both of Yokohama; Taketosi Kawabe, Tokyo, all of Japan

[73] Assignee: Nissan Motor Co., Ltd., Yokohama, Japan

[21] Appl. No.: 773,650

[22] Filed: Sep. 9, 1985

[30] Foreign Application Priority Data

Sep. 10, 1984 [JP] Japan .................................. 59-188153
Jan. 28, 1985 [JP] Japan .................................. 60-13925
Jan. 31, 1985 [JP] Japan .................................. 60-15512

[51] Int. Cl.$^4$ .............................................. B62D 6/02
[52] U.S. Cl. ..................................... 280/91; 364/424
[58] Field of Search .............. 180/140, 141, 142, 143, 180/132; 364/424, 425; 280/91; 318/580, 585, 586, 587

[56] References Cited

U.S. PATENT DOCUMENTS

| | | | |
|---|---|---|---|
| 3,866,706 | 2/1975 | Lincke | 180/142 |
| 3,897,846 | 8/1975 | Inoue | 180/142 |
| 4,412,594 | 11/1983 | Furukawa | 180/142 |
| 4,418,780 | 12/1983 | Ito | 180/142 |
| 4,441,572 | 4/1984 | Ito | 180/140 |
| 4,476,524 | 10/1984 | Nakamura | 364/424 |

FOREIGN PATENT DOCUMENTS 0079754 6/1980 Japan .................................. 180/142
0026366 2/1984 Japan .................................. 180/140

Primary Examiner—John J. Love
Assistant Examiner—Karin L. Ferriter
Attorney, Agent, or Firm—Schwartz, Jeffery, Schwaab, Mack, Blumenthal & Evans

[57] ABSTRACT

A control system for steering front wheels and rear wheels of a controlled vehicle has a processing unit such as a microcomputer which determines a desired value of at least one of dynamical variables such as yaw rate, yaw acceleration, and lateral acceleration from sensed steering input and sensed vehicle speed by solving equations of motion of a vehicle in which parameters inherent to the vehicle are set equal to desired values so determined as to provide desired cornering characteristics. From the desired value of the dynamical variable, the processing unit determines desired values of front and rear steering angles of the front and rear wheels required to achieve the desired value of the dynamical variable in the controlled vehicle. The control system further has a front wheel steering actuator for steering the front wheels in accordance with the desired value of the front steering angle, and a rear wheel steering actuator for steering the rear wheels in accordance with the desired value of the rear steering angle.

17 Claims, 17 Drawing Figures

STEERING CONTROL SYSTEM FOR WHEELED VEHICLE

BACKGROUND OF THE INVENTION

The present invention relates to a control system for steering a vehicle having steerable front wheels and steerable rear wheels.

In a conventional vehicle having only a mechanical steering linkage, front wheels are steered in accordance with an angular displacement of a steering wheel (steering input quantity), and a dynamical variable such as yaw rate responsive to steering input is determined uniformly by a construction of the vehicle. Therefore, cornering characteristics are fixed according to a type of vehicle. It is practically impossible to endow a vehicle of a sedan type with characteristics of a vehicle of a sports car type without changing a vehicle construction drastically.

A competition car(rally car) is required to have superior accelerating ability and superior steering response simultaneously. However, these two requirements are incompatible because improvement of accelerating ability by increasing engine displacement unavoidably deteriorates steering response by increasing vehicle weight.

SUMMARY OF THE INVENTION

It is an object of the present invention to provide a steering control system which can provide desired cornering characteristics to a vehicle freely without being restrained by vehicle construction.

According to the present invention, a steering control system for a controlled vehicle having a pair of front wheels and a pair of rear wheels comprises (1) steering input sensing means, (2) vehicle speed sensing means, (3) target determining means, (4) steering angle determining means, and (5) front and rear wheel steering actuating means. The steering input sensing means senses a steering input quantity (such as an angular displacement of a steering wheel) representing a steering command of a driver of the controlled vehicle and determines a sensed value of the steering input quantity. The vehicle speed sensing means senses a vehicle speed of the controlled vehicle and determines a sensed value of the vehicle speed. The target determinging means is connected with the steering input sensing means and the vehicle speed sensing means for determining a desired value of at least one of dynamical variables (such as yaw rate, yaw acceleration, and lateral acceleration of a vehicle) corresponding to said sensed values of the steering input quantity and vehicle speed by using a group of equations of motion of a first desired vehicle obtained by setting vehicle parameters appearing in the equations equal to desired values determined by said desired vehicle. The steering angle determining means is connected with the target determining means for determining desired values of front and rear steering angles of the front wheels and rear wheels required to achieve the desired value of the dynamical variable, by using the desired value of the dynamical variable and actual values of the vehicle parameters determined by the controlled vehicle. The front wheel steering actuating means steers the front wheels of the controlled vehicle so that the actual front steering angle of the front wheels remains equal to the desired value of the front steering angle. The rear wheel steering actuating means steers the rear wheels of the controlled vehicle so that the actual rear steering angle of the rear wheels remains equal to the desired value of the rear steering angle.

DETAILED DESCRIPTION OF THE INVENTION

Figure 1:
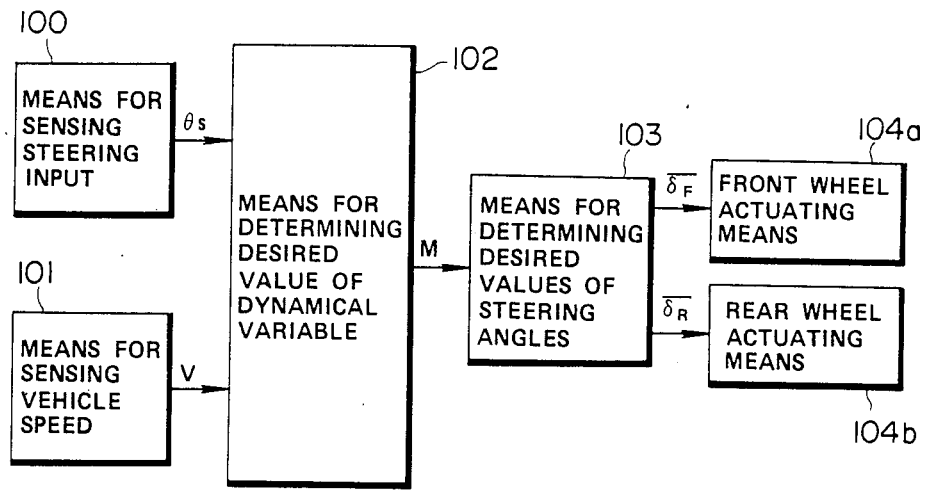
FIG. 1 is a block diagram of a steering control system showing a first embodiment of the present invention.

A first embodiment of the present invention is shown in FIGS. 1-4. As shown in FIG. 1, a control system for steering a controlled vehicle of the first embodiment has a means 100 for sensing a steering input quantity such as a steering input angle $\theta_S$ of a steering wheel of the controlled vehicle, a means 101 for sensing a speed V of the controlled vehicle, a means 102 for determining a desired value M of at least one of dynamical variables such as a yaw acceleration and a centripetal acceleration, a means 103 for determining a desired value of a front steering angle of the front wheels of the controlled vehicle, and a desired value of a rear steering angle of the rear wheels, a front wheel steering actuating means 104a and a rear wheel steering actuating means 104b.

Figure 2:
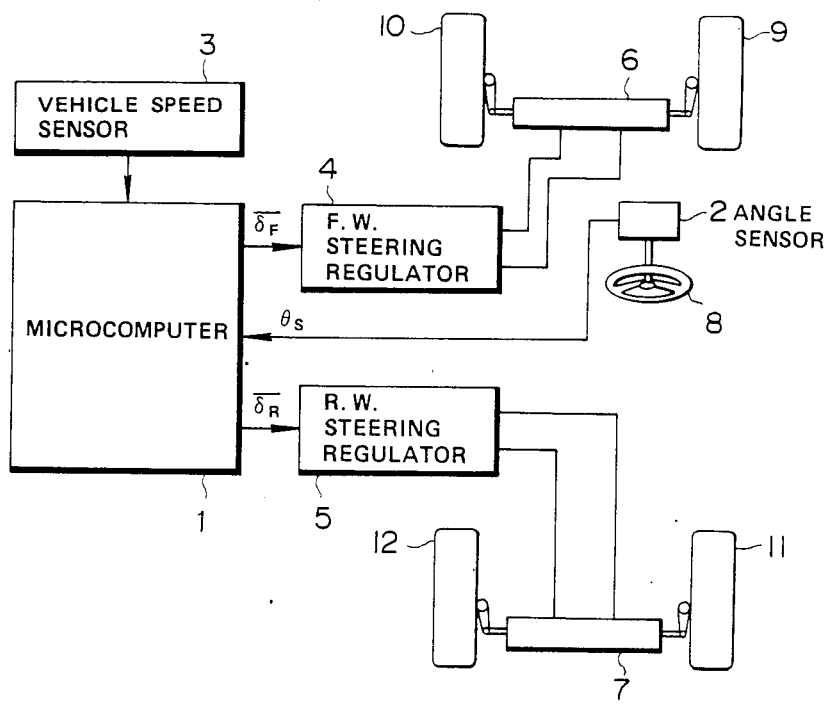
FIG. 2 is a schematic view showing an arrangement of the steering control system of the first embodiment.

As shown in FIG. 2, the means 100 takes the form of a steering angle sensor 2 for sensing an angular displacement of a steering wheel 8 of the controlled vehicle, and the means 101 takes the form of a vehicle speed sensor 3. A microcomputer 1 serves as both of the means 102 and the means 103.

The microcomputer 1 receives the sensed steering input quantity and the sensed vehicle speed, respectively, from the steering angle sensor 2 and the vehicle speed sensor 3, and calculates the desired value M and the desired values $\bar{\delta}$ and $\bar{\delta}_R$.

The front wheel steering actuating means 104a has a front wheel steering regulator 4 and a front hydraulic steering actuator 6 for steering front wheels 9 and 10 of the controlled vehicle. The rear wheel steering actuating means 104b has a rear wheel steering regulator 5 and a rear hydraulic steering actuator 7 for steering rear wheels 11 and 12 of the controlled vehicle.

Figure 3:
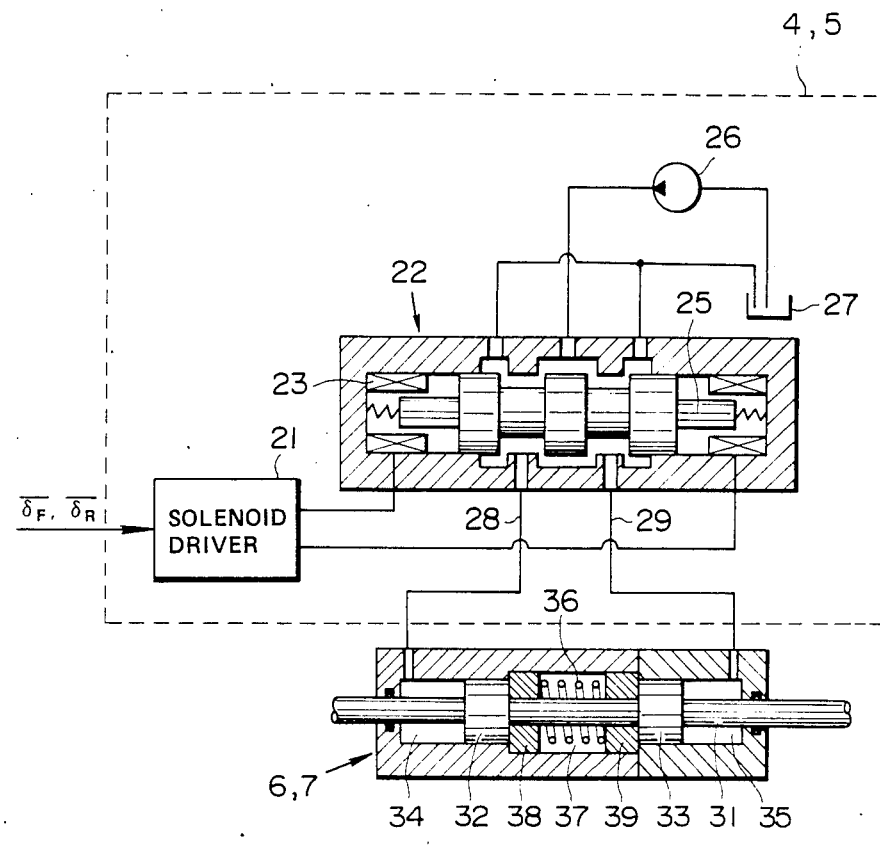
FIG. 3 is a view partly in section showing front wheel and rear wheel steering regulators and actuators shown in FIG. 2.

FIG. 3 shows the front wheel steering actuating means 104a consisting of the regulator 4 and hydraulic actuator 6, and the rear wheel steering actuating means 104b consisting of the regulator 5 and hydraulic actuator 7. Both means 104a and 104b are essentially identical to each other.

Each of the hydraulic actuators 6 and 7 has two pistons 32 and 33 and a shaft 31 both ends of which are connected, respectively, to tie rods. Each hydraulic actuator 6 or 7 steers the wheels by moving the shaft 31 axially in accordance with an oil pressure difference between right and left oil chambers 34 and 35.

In a central chamber 37 of each actuator 6 or 7, discs 38 and 39 are loosely mounted on the shaft 31. A spring 36 is disposed between the discs 38 and 39 for biasing the discs in the opposite directions. The spring 36 restores the shaft 31 to its neutral position when the oil pressure is drained from the right and left chambers 34 and 35.

Each of the front and rear steering regulators 4 and 5 has a solenoid driver 21, a control valve 22, an oil pump 26 and an oil tank 27.

The control valve 22 of each regulator 4 or 5 has oil passages 28 and 29 leading, respectively, to the left and right chambers 34 and 35 of the hydraulic actuator 6 or 7. The control valve 22 further has a spool 25 which regulates the oil flow rate through the oil passages 28 and 29 by moving axially. Left and right ends of the spool 25 are surrounded, respectively, by left and right electromagnetic solenoids 23 and 24 so that the spool 25 is moved axially by the solenoids 23 and 24.

The solenoid driver 21 of each regulator 4 or 5 supplies a current signal proportional to the target value $\bar{\delta}_F$ or $\bar{\delta}_R$ of the front or rear steering angle determined by the microcomputer 1 to either of the left and right solenoids 23 and 24 which is selected in accordance with a steering direction.

Figure 4:
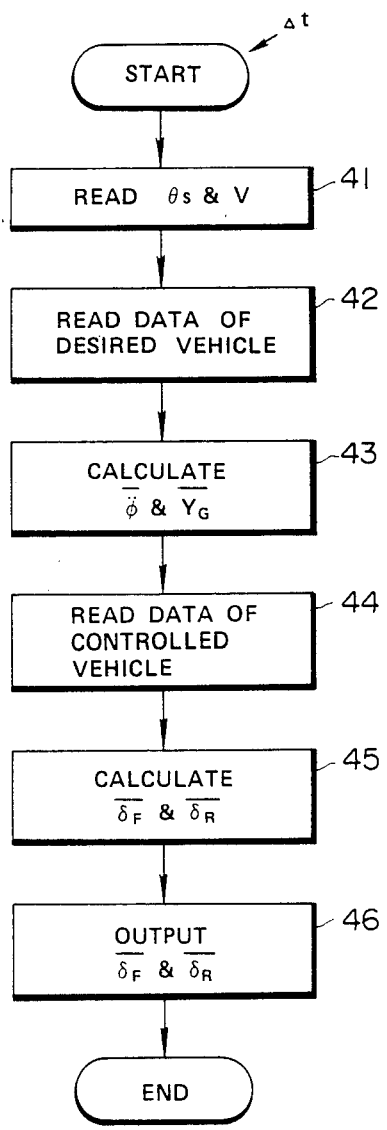
FIG. 4 is a flowchart showing a program used in the first embodiment.

FIG. 4 shows a program executed by the microcomputer 1. Initialization is performed when an ignition switch is turned on, and power is supplied to the microcomputer 1. The microcomputer 1 repeats the program regularly at predetermined time intervals of a length $\Delta t$.

At a step 41 of FIG. 4, a central processing unit (CPU) of the microcomputer 1 reads an instantaneous value of the sensed steering input quantity $\theta_S$ and an instantaneous value of the sensed vehicle speed V which are inputted to the microcomputer 1, respectively, from the steering angle sensor 2 and vehicle speed sensor 3.

At a step 42, the CPU reads data of a desired vehicle, which are stored in a memory. The desired vehicle is not necessarily the same as the controlled vehicle on which this steering control system is mounted. For example, the desired vehicle may be a type of sports car while the controlled vehicle may be a sedan type.

In this embodiment, the data of the desired vehicle are as follows:

$I_{Z1}$ = a yawing moment of inertia of the desired vehicle,
$M_1$ = a vehicle mass of the desired vehicle,
$L_1$ = a wheel base of the desired vehicle,
$L_{F1}$ = a distance between a front axle and a center of gravity of the desired vehicle,
$L_{R1}$ = a distance between a rear axle and the center of gravity of the desired vehicle,
$I_{K1}$ = a moment of inertia about a kingpin of the desired vehicle,
$K_{S1}$ = a steering stiffness of the desired vehicle,
$D_{K1}$ = a viscosity coefficient of a steering system of the desired vehicle,
$\xi_1$ = a trail of the desired vehicle,
$N_1$ = an overall steering (gear) ratio of the desired vehicle,
$K_{F1}$ = a cornering power of each of front wheels of the desired vahicle,
$K_{R1}$ = a cornering power of each of rear wheels of the desired vehicle.

At a step 43, the CPU of the microcomputer 1 performs operations to determine a desired value of at least one of the dynamical variables. In this embodiment, the CPU determines desired values of yaw acceleration and a lateral acceleration (centripetal acceleration) by using the following equations.

$$I_{K1}\ddot{\delta}_{F1} = N_1 K_{S1}(\theta_S - N_1\delta_{F1}) - D_{K1}\dot{\delta}_{F1} - 2\xi_1 C_{F1} \quad (1)$$

$$M_1(\ddot{y}_1 + \dot{\phi}_1 V) = 2C_{F1} + 2C_{R1} \quad (2)$$

$$I_{Z1}\ddot{\phi}_1 = 2L_{F1}C_{F1} - 2L_{R1}C_{R1} \quad (3)$$

$$\beta_{F1} = \delta_{F1} - (\dot{y}_1 + L_{F1}\dot{\phi}_1)/V \quad (4)$$

$$\beta_{R1} = -(\dot{y}_1 - L_{R1}\dot{\phi}_1)/V \quad (5)$$

$$C_{F1} = K_{F1}\beta_{F1} \quad (6)$$

$$C_{R1} = K_{R1}\beta_{R1} \quad (7)$$

$$\ddot{\bar{\phi}} = \ddot{\phi}_1 \quad (8)$$

$$\overline{Y}_G = \ddot{y}_1 + \dot{\phi}_1 V \quad (9)$$

where
$\delta_{F1}$ = a steering angle of the front wheels of the desired vehicle (In this embodiment, the desired vehicle is a two-wheel steering vehicle.),
$\dot{\phi}_1$ = a yaw rate of the desired vehicle,
$\ddot{\phi}_1$ = a yaw acceleration of the desired vehicle,
$\dot{y}_1$ = a lateral speed of the desired vehicle along its lateral, or Y, axis,
$\ddot{y}_1$ = a side slipping acceleration of the desired vehicle,
$\beta_{F1}$ = a side slip angle of the front wheels of the desired vehicle,
$\beta_{R1}$ = a side slip angle of the rear wheels of the desired vehicle,
$C_{F1}$ = a cornering force of each of the front wheels of the desired vehicle,
$C_{R1}$ = a cornering force of each of the rear wheels of the desired vehicle,
$\ddot{\bar{\phi}}$ = a desired value of the yaw acceleration,
$\overline{Y}_G$ = a desired value of the lateral acceleration (centripetal acceleration).

The equations (1)–(3) are equations of motion of the desired vehicle. In order to solve these equations, the CPU of the microcomputer 1 must perform four integrations in each interval of $\Delta t$. A method of integration is chosen according to the required accuracy of integration. For example, an integration method expressed as;

$$A(t+\Delta t) = A(t) + \Delta t \cdot \dot{A}(t)$$

or Runge-Kutta method may be employed.

Thus, the CPU determines the desired value $\ddot{\bar{\phi}}$ of the yaw acceleration and the desired value $\overline{Y}_G$ of the lateral acceleration which are magnitudes of the yaw acceleration and lateral acceleration of the desired vehicle corresponding to the instantaneous values of the steering input quantity $\theta_S$ and vehicle speed V. The control system of this embodiment is arranged to achieve the thus-determined desire values $\bar{\ddot{\varphi}}$ and $\bar{Y}_G$ in the controlled vehicle.

At a next step 44, the CPU reads data of the controlled vehicle which are preliminarily stored in the memory. In this embodiment, the data of the controlled vehicle are as follows:

$I_{Z2}$ = a yawing moment of inertia of the controlled vehicle, $M_2$ = a vehicle mass of the controlled vehicle, $L_2$ = a wheel base of the controlled vehicle, $L_{F2}$ = a distance between a front axle and a center of gravity of the controlled vehicle, $L_{R2}$ = a distance between a rear axle and the center of gravity of the controlled vehicle, $K_{F2}$ = a cornering power of each of the front wheels of the controlled vehicle, $K_{R2}$ = a cornering power of each of the rear wheels of the controlled vehicle.

At a step 45, the CPU calculates a desired value $\bar{\delta}_F$ of the front wheel steering angle and a desired value $\bar{\delta}_R$ of the rear wheel steering angle of the controlled vehicle from the data of the controlled vehicle and the desired value $\bar{\ddot{\varphi}}$ of the yaw acceleration and the desired value $\bar{Y}_G$ of the lateral acceleration determined in the step 43 by using the following equations.

$$C_{F2} = \frac{1}{2L_2}(M_2 L_{R2} \bar{Y}_G + I_{Z2} \bar{\ddot{\varphi}}) \quad (10)$$

$$C_{R2} = \frac{1}{2L_2}(M_2 L_{F2} \bar{Y}_G - I_{Z2} \bar{\ddot{\varphi}}) \quad (11)$$

$$\beta_{F2} = C_{F2}/K_{F2} \quad (12)$$

$$\beta_{R2} = C_{R2}/K_{R2} \quad (13)$$

$$\bar{\delta}_F = \beta_{F2} + (\dot{y}_2 + L_{F2}\dot{\varphi}_2)/V \quad (14)$$

$$\bar{\delta}_R = \beta_{R2} + (\dot{y}_2 - L_{R2}\dot{\varphi}_2)/V \quad (15)$$

$$\dot{y}_2 = \dot{y}_1 \quad (16)$$

$$\dot{\varphi}_2 = \dot{\varphi}_1 \quad (17)$$

where $C_{F2}$ = a cornering force of each of the front wheels of the controlled vehicle, $C_{R2}$ = a cornering force of each of the rear wheels of the controlled vehicle, $\beta_{F2}$ = a side slip angle of the front wheels of the controlled vehicle, $\beta_{R2}$ = a side slip angle of the rear wheels of the controlled vehicle, $\dot{\varphi}_2$ = a yaw rate of the controlled vehicle, $\dot{y}_2$ = a lateral speed of the controlled vehicle along its lateral, or Y, axis.

At a step 46, the CPU of the microcomputer 1 sends a signal representing the desired value $\bar{\delta}_F$ of the front wheel steering angle to the front wheel steering regulator 4, and a signal representing the desired value $\bar{\delta}_R$ of the rear wheel steering angle to the rear wheel steering regulator 5.

In response to the signals from the microcomputer 1, the front and rear wheel steering regulators 4 and 5 supply fluid pressure, respectively, to the front and rear wheel steering hydraulic actuators 6 and 7, so that the front wheels 9 and 10 and the rear wheels 11 and 12 are steered so as to achieve the desired values $\bar{\delta}_F$ and $\bar{\delta}_R$.

Therefore, the yaw acceleration and lateral acceleration of the controlled vehicle are maintained equal to those of the desired vehicle, respectively, so that the controlled vehicle has cornering charactestics identical to those of the desired vehicle. In the case that the controlled vehicle is of a sedan type and the desired vehicle is of a sports car type, the characteristics of the controlled vehicle are changed to characteristics of a sports car without changing the construction of the body of the controlled vehicle.

FIGS. 5–8 show the effect obtained by the first embodiment concretely. In the example of FIGS. 5–8, the controlled vehicle has an engine of a 2000 cc displacement and a yawing moment of inertia of 240 kgf m $s^2$, and the desired vehicle has an engine of an equal displacement, and a yawing moment of inertia of 120 kgf m $s^2$. In the other data, the controlled and desired vehicles are equal.

Figure 5:
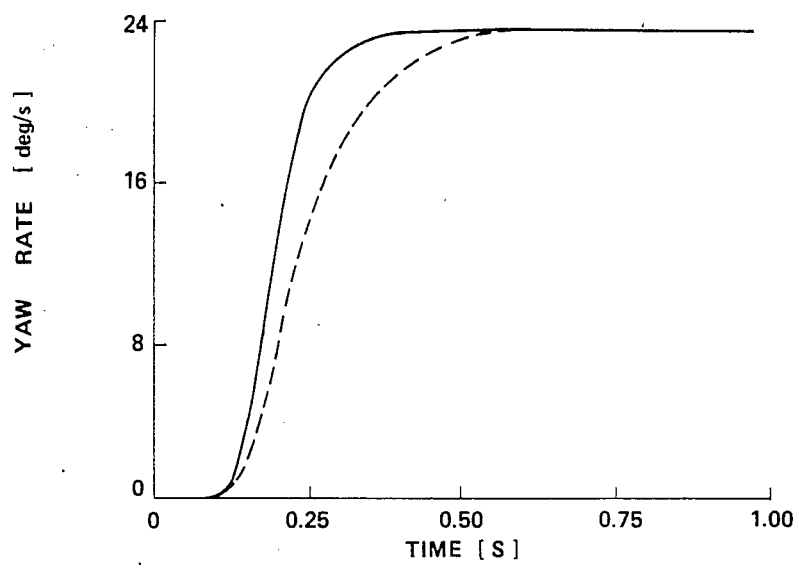
FIGS. 5-8 are graphs showing steering response characteristics of a vehicle equipped with the steering control system of the first embodiment.
Figure 6:
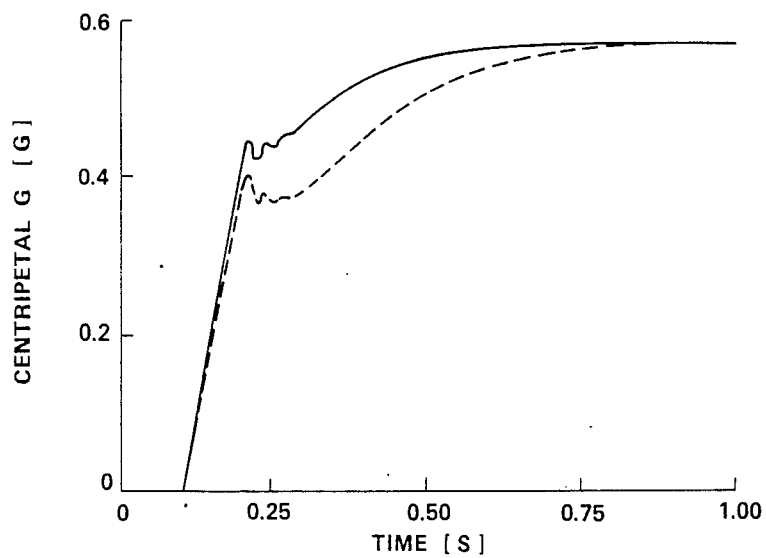

FIGS. 5 and 6 show changes in the yaw rate and centripetal (lateral) acceleration, respectively, when the steering wheel is turned in the manner of a step change through 120° in 0.1 second at a vehicle speed V of 50 km/h.

Figure 7:
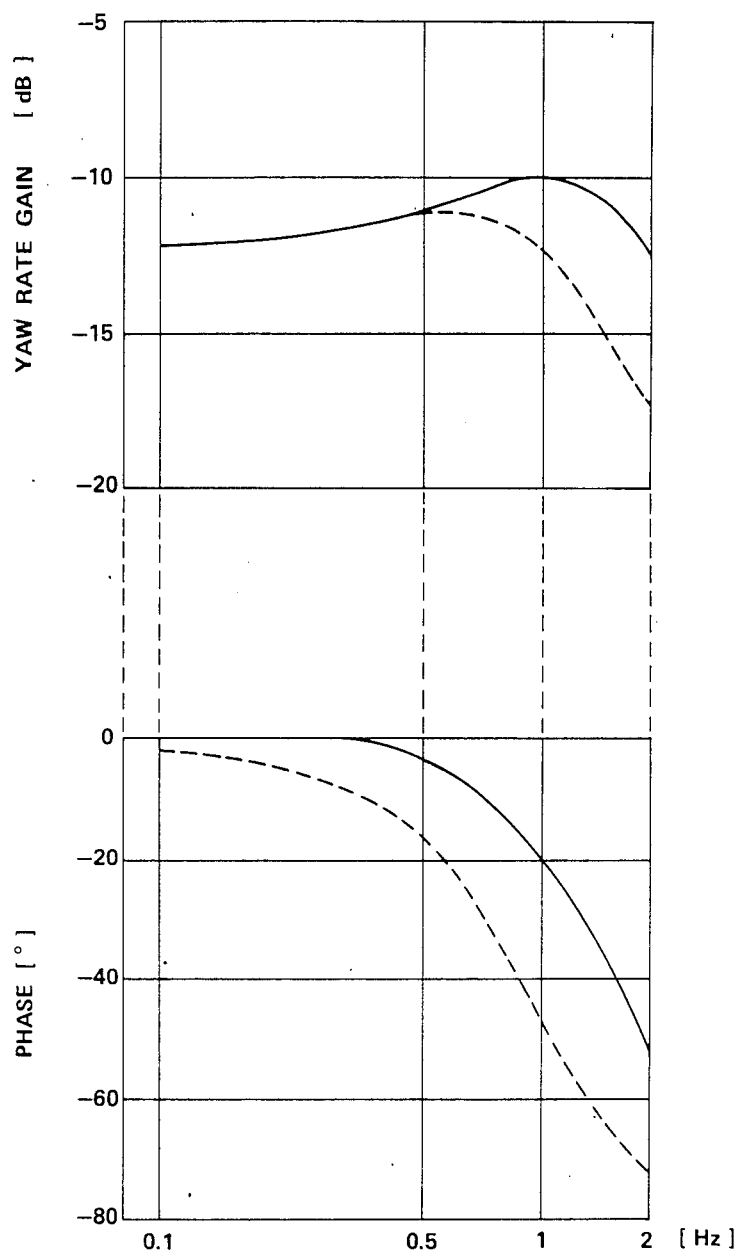
Figure 8:
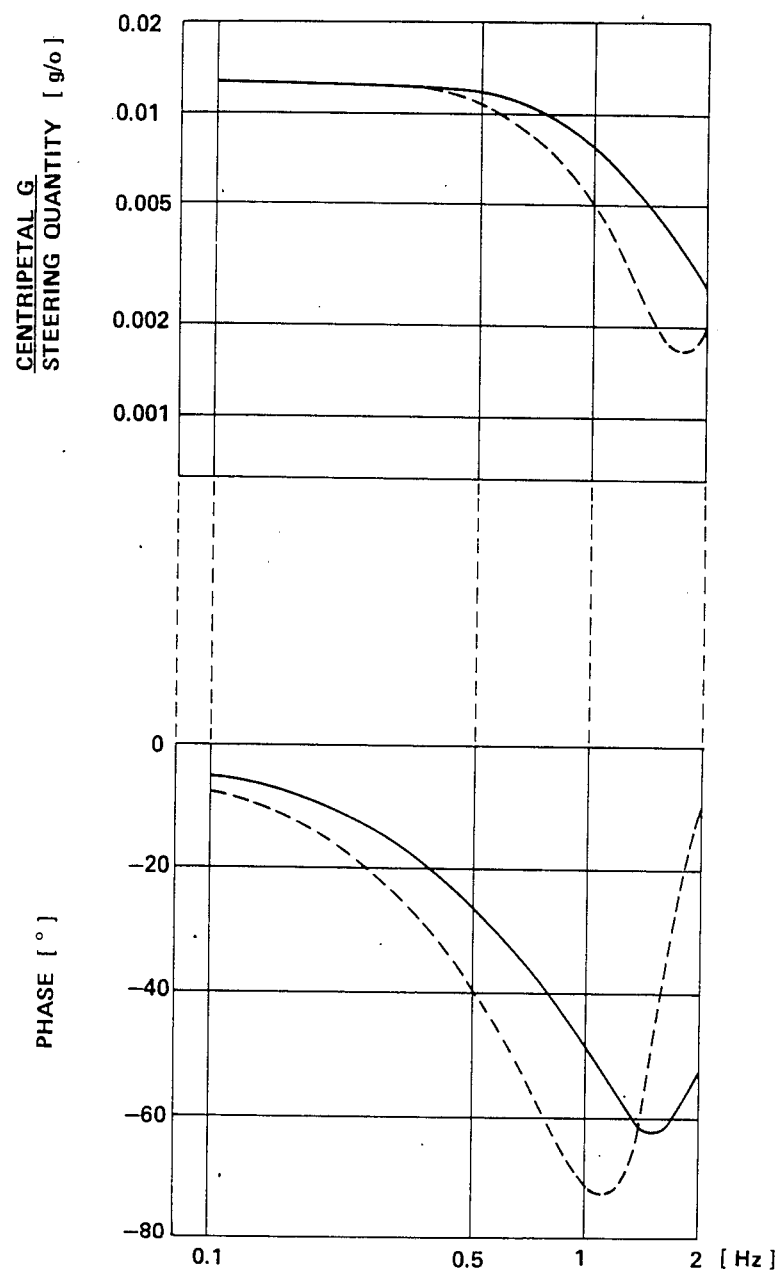

FIGS. 7 and 8 show frequency-response characteristics, in both gain (steering output quantity/steering input quantity) and phase difference, obtained when the steering wheel is turned sinusoidally between ±30° at a vehicle speed of 100 km/h, and steering frequency is varied from 0.1 Hz to 2 Hz. In FIG. 7, the steering output quantity is a yaw rate, so that the gain is a yaw rate gain. In FIG. 8, the steering output quantity is a centripetal (lateral) acceleration.

In each of FIGS. 5–8, a solid line shows a characteristic obtained by this embodiment, and a broken line shows a characteristic of a vehicle equipped with a steering system of a conventional mechanical linkage type.

As shown in FIGS. 5 and 6, the steering response characteristics are improved in the vehicle equipped with the steering control system of the first embodiment as compared with the conventional vehicle. For example, the time required for the yaw rate to reach 90% of a new steady state value is shortened to about 0.17 s whereas the conventional example requires about 0.27 s.

As shown in FIGS. 7 and 8, the frequency-response characteristics are improved in the vehicle equipped with the steering control system of the first embodiment as compared with the conventional example. The gain is improved, and the phase lag is reduced especially in a high frequency range.

The desired vehicle may be an actual vehicle or may be an imaginary vehicle having ideal cornering characteristics. Accordingly, it is possible to mount a large-sized engine on a rally car and simultaneously to improve the steering response characteristics.

The desired vehicle may be of a midship engine type. In this case, it is possible to make a front or rear engine vehicle having cornering characteristics equivalent to the characteristics of a midship engine vehicle.

Furthermore, the steering control system may be arranged to store sets of data of two or more desired vehicles, and to select one of the desired vehicles according to driver's volition.

The steering control system of the first embodiment is arranged to determine two desired values of the yaw acceleration and lateral acceleration. However, it is optional to employ the cornering force (or forces) and/or the side slip angle (or angles) in place of the yaw acceleration and centripetal acceleration. Furthermore, it is optional to arrange the steering control system to determine a desired value of only one dynamical variable or to determine desired values of three or more dynamical variable.

Figure 9:
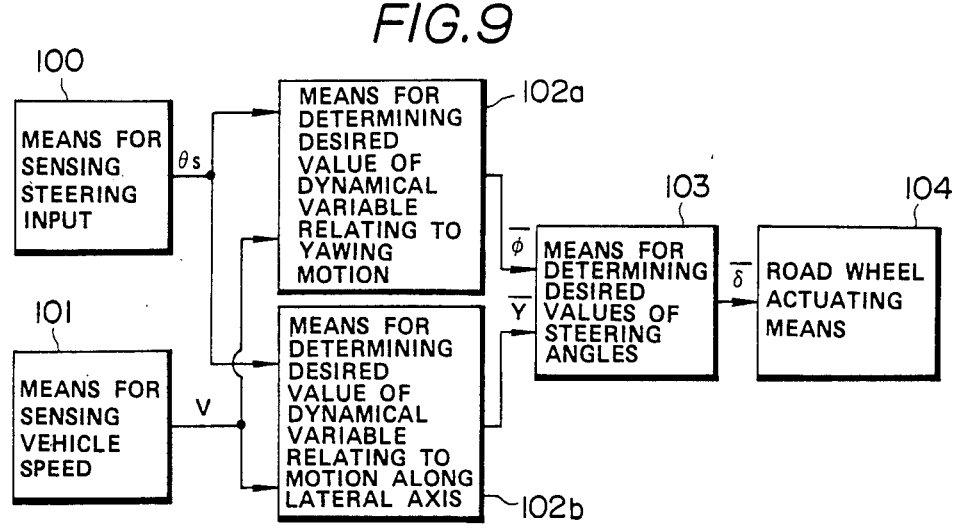
FIG. 9 is a block diagram of a steering control system showing a second embodiment of the present invention.
Figure 10:
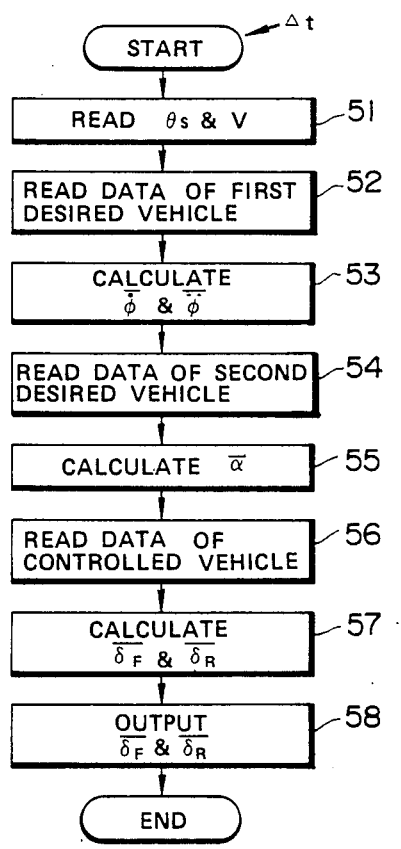
FIG. 10 is a flowchart showing a program used in the second embodiment.

A second embodiment of the present invention is shown in FIGS. 9 and 10. The first embodiment uses only one desired vehicle as a model, so that the desired values of the dynamic variables determined in the first embodiment are interrelated with each other. In the case that the yaw rate and lateral acceleration are employed, for example, the control system of the first embodiment cannot control the yaw rate independently of the lateral acceleration. Therefore, the control of the first embodiment is not flexible.

As shown in FIG. 9, a steering control system of the second embodiment has a means 102a for determining a desired value $\bar{\phi}$ of a dynamic variable relating to yawing motion from the steering input quantity $\theta_S$ sensed by the steering input sensing means 100 and vehicle speed V sensed by the vehicle speed sensing means 101 by using data of a first desired vehicle, and a means 102b for determining a desired value $\overline{Y}$ of a dynamical variable relating to motion along the lateral axis from the steering input quantity $\theta_S$ and vehicle speed V by using data of a second desired vehicle. The means 103 determines desired values of the front and rear wheel steering angles, and the means 104 actually steers the front and rear wheels in accordance with the desired values of the front and rear wheel steering angles.

The construction of the second embodiment is the same as that of the first embodiment shown in FIG. 2 except that the microcomputer 1 of the second embodiment serves as the means 102a and 102b in place of the means 102 of the first embodiment.

The road wheel actuating means consists of the front and rear wheel actuating means 104a and 104b which have the same construction as shown in FIG. 3.

FIG. 10 shows a program of the second embodiment. As in the first embodiment, the microcomputer 1 repeats the program regularly at the predetermined time interval $\Delta t$.

At a step 51, the CPU of the microcomputer 1 reads instantaneous values of the steering input quantity $\theta_S$ and vehicle speed V, like the step 41 of FIG. 4.

At a step 52, the CPU reads data of a first desired vehicle which are stored in a memory. The first desired vehicle is a model having desired characteristics relating to yaw.

In the second embodiment, the data of the first desired vehicle are as follows:

$I_{Z1}$: a yawing moment of inertia of the first desired vehicle,
$M_1$: a vehicle mass of the first desired vehicle,
$L_{F1}$: a distance between a front axle and a center of gravity of the first desired vehicle,
$L_{R1}$: a distance between a rear axle and the center of gravity of the first desired vehicle,
$N_1$: an overall steering (gear) ratio of the first desired vehicle,
$K_{F1}$: a cornering power of each of the front wheels of the first desired vahicle,
$K_{R1}$: a cornering power of each of the rear wheels of the first desired vehicle.

At a step 53, the CPU of the microcomputer 1 performs operations to determine desired values of one or more dynamical variables relating to yawing motion from the data of the first desired vehicle. In this embodiment, the CPU determines a desired value $\bar{\phi}$ of the yaw rate $\dot{\phi}$ and a desired value $\bar{\ddot{\phi}}$ of the yaw acceleration $\ddot{\phi}$ by using the following equations.

$$M_1(\ddot{y}_1 + \dot{\phi}_1 V) = 2C_{F1} + 2C_{R1} \tag{21}$$

$$I_{Z1}\ddot{\phi}_1 = 2L_{F1}C_{F1} - 2L_{R1}C_{R1} \tag{22}$$

$$C_{F1} = K_{F1}\left\{\frac{\theta_S}{N_1} - (\dot{y}_1 + L_{F1}\dot{\phi}_1)/V\right\} \tag{23}$$

$$C_{R1} = -K_{R1}(\dot{y}_1 - L_{R1}\dot{\phi}_1)/V \tag{24}$$

$$\bar{\ddot{\phi}} = \ddot{\phi}_1 \tag{25}$$

$$\bar{\dot{\phi}} = \dot{\phi}_1 \tag{26}$$

where
$\dot{\phi}_1$ = a yaw rate of the first desired vehicle,
$\ddot{\phi}_1$ = a yaw acceleration of the first desired vehicle,
$\dot{y}_1 = V_{y1}$ = a lateral speed of the first desired vehicle along its lateral axis,
$\ddot{y}_1 = \dot{V}_{y1}$ = a side slipping acceleration of the first desired value,
$C_{F1}$ = a cornering force of each of the front wheels of the first desired vehicle,
$C_{R1}$ = a cornering force of each of the rear wheels of the first desired vehicle.

The equations (21) and (22) are equations of motion of the first desired vehicle. In order to solve these equations, two integrations are required in each of the time intervals of $\Delta t$.

The first desired vehicle is a model for control of yawing motion. Therefore, the variables $\dot{y}_1$ and $\ddot{y}_1$ relating to lateral rectilinear motion are not used in the calculation of the desired values of the steering angles.

At a step 54, the CPU reads data of a second desired vehicle which are stored in the memory. The second desired vehicle is a model having desired characteristics relating to rectilinear motion along the lateral axis.

In the second embodiment, the data of the second desired vehicle are as follows.

$I_{Z2}$ = a yawing moment of inertia of the second desired vehicle,
$M_2$ = a vehicle mass of the second desired vehicle,
$L_{F2}$ = a distance between a front axle and a center of gravity of the second desired vehicle,
$L_{R2}$ = a distance between a rear axle and the center of gravity of the second desired vehicle,
$N_2$ = an overall steering (gear) ratio of the second desired vehicle,
$K_{F2}$ = a cornering power of each of the front wheels of the second desired vehicle,
$K_{R2}$ = a cornering power of each of the rear wheels of the second desired vehicle.

At a step 55, the CPU performs operations to determine a desired value of the dynamical variable relating to lateral motion (a desired value $\bar{\alpha}$ of a lateral acceleration $\alpha$ in the second embodiment) ($\bar{\alpha} = \overline{Y}_G$), by using the following equations.

$$M_2(\ddot{y}_2 + \dot{\phi}_2 V) = 2C_{F2} + 2C_{R2} \tag{27}$$

$$I_{Z2}\ddot{\phi}_2 = 2L_{F2}C_{F2} - 2L_{R2}C_{R2} \tag{28}$$

$$C_{F2} = K_{F2}\left\{\frac{\theta_S}{N_2} - (\dot{y}_2 + L_{F2}\dot{\phi}_2)/V\right\} \quad (29)$$

$$C_{R2} = -K_{R2}(\dot{y}_2 - L_{R2}\dot{\phi}_2)/V \quad (30)$$

$$\overline{a} = \ddot{y}_2 + \dot{\phi}_2 V \quad (31)$$

where
- $\dot{\phi}_2$ = a yaw rate of the second desired vehicle,
- $\ddot{\phi}_2$ = a yaw acceleration of the second desired vehicle,
- $\dot{y}_2 = V_{y2}$ = a lateral speed of the second desired vehicle,
- $\ddot{y}_2 = \dot{V}_{y2}$ = a side slipping acceleration of the second desired vehicle,
- $C_{F2}$ = a cornering force of each of the front wheels of the second desired vehicle,
- $C_{R2}$ = a cornering force of each of the rear wheels of the second desired vehicle.

The equations (27) and (28) are equations of motion of the second desired vehicle, and these equations are integrated like the equations (21) and (22).

The second desired vehicle is a model for control of lateral motion. Therefore, the variables $\dot{\phi}_2$ and $\ddot{\phi}_2$ relating to yaw are not used in the calculation of the desired values of the steering angles.

Thus, the steering control system of the second embodiment determines the desired values of the yaw rate and yaw acceleration and the desired value of the lateral acceleration, respectively, from data of the first and second desired vehicles whose dynamic characteristics are independent from each other. Therefore, the resulting desired values of yaw and the desired value of lateral motion are independent from each other.

At steps 56, 57 and 58, the CPU controls the steering angles of the front and rear wheels of the controlled vehicle to achieve the desired values $\dot{\phi}$, $\ddot{\phi}$ and $\overline{a}$ in the controlled vehicle.

At the step 56, the CPU reads data of the controlled vehicle which are stored in the memory. In the second embodiment, the data of the controlled vehicle are as follows:
- $I_{Z3}$ = a yawing moment of inertia of the controlled vehicle,
- $M_3$ = a vehicle mass of the controlled vehicle,
- $L_{F3}$ = a distance between a front axle and a center of gravity of the controlled vehicle,
- $L_{R3}$ = a distance between a rear axle and the center of gravity of the controlled vehicle,
- $L_3$ = a wheel base of the controlled vehicle,
- $K_{F3}$ = a cornering power of each of the front wheels of the controlled vehicle,
- $K_{R3}$ = a cornering power of each of the rear wheels of the controlled vehicle, At the step 57, the CPU determines desired value $\overline{\delta_F}$ and $\overline{\delta_R}$ of the front and rear wheel steering angles from the data of the controlled vehicle, and the desired values $\dot{\phi}$, $\ddot{\phi}$ and $\overline{a}$ by using the following equations.

$$\ddot{y}_3 = \overline{a} - \dot{\phi}V \quad (32)$$

$$\dot{y}_3 = \int \ddot{y}_3 dt \quad (33)$$

$$C_{F3} = \frac{1}{2L_3}(M_3 L_{R3}\overline{a} + I_{Z3}\ddot{\phi}) \quad (34)$$

$$C_{R3} = \frac{1}{2L_3}(M_3 L_{F3}\overline{a} - I_{Z3}\ddot{\phi}) \quad (35)$$

$$\beta_{F3} = C_{F3}/K_{F3} \quad (36)$$

$$\beta_{R3} = C_{R3}/K_{R3} \quad (37)$$

$$\overline{\delta_F} = \beta_{F3} + (\dot{y}_3 - L_{F3}\overline{\dot{\phi}})/V \quad (38)$$

$$\overline{\delta_R} = \beta_{R3} + (\dot{y}_3 - L_{R3}\overline{\dot{\phi}})/V \quad (39)$$

where
- $\dot{y}_3 = V_{y3}$ = a lateral speed of the controlled vehicle along its lateral axis,
- $\ddot{y}_3 = \dot{V}_{y3}$ = a side slipping acceleration of the controlled vehicle,
- $C_{F3}$ = a cornering force of each of the front wheels of the controlled vehicle,
- $C_{R3}$ = a cornering force of each of the rear wheels of the controlled vehicle,
- $\beta_{F3}$ = a side slip angle of the front wheels of the controlled vehicle,
- $\beta_{R3}$ = a side slip angle of the rear wheels of the controlled vehicle, In the operations of the step 57, the CPU determines the variable $\dot{y}_3$ of lateral motion which is necessary to determine the desired values $\overline{\delta_F}$ and $\overline{\delta_R}$ of the steering angles, on the basis of the desired values $\overline{a}$ and $\dot{\phi}$. In general, the variable $\dot{y}_3$ has a value unequal to the variables $\dot{y}_1$ and $\dot{y}_2$ except some particular solutions.

At the step 58, the desired values $\overline{\delta_F}$ and $\overline{\delta_R}$ of the front and rear wheel steering angles are outputted to the front wheel steering regulator 4 and the rear wheel steering regulator 5, respectively. In accordance with the desired value $\overline{\delta_F}$, the front regulator 4 steers the front wheels 9 and 10 by supplying hydraulic pressure to the front hydraulic actuator 6. Similarly, the rear regulator 5 steers the rear wheels 11 and 12 by supplying hydraulic pressure to the rear hydraulic actuator 7 in accordance with the desired value $\overline{\delta_R}$.

As a result, the yawing motion of the controlled vehicle is controlled according to the dynamical characteristics of yaw of the first desired vehicle, while on the other hand, the lateral motion of the controlled vehicle is controlled according to the dynamical characteristics of lateral motion of the second desired vehicle. The control system of the second embodiment can control the yawing motion and lateral motion of the controlled vehicle independently from each other.

Figure 11:
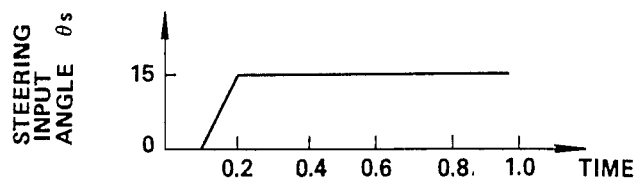
FIGS. 11-14 are graphs showing steering response characteristics of a vehicle equipped with the steering control system of the second embodiment.
Figure 12:
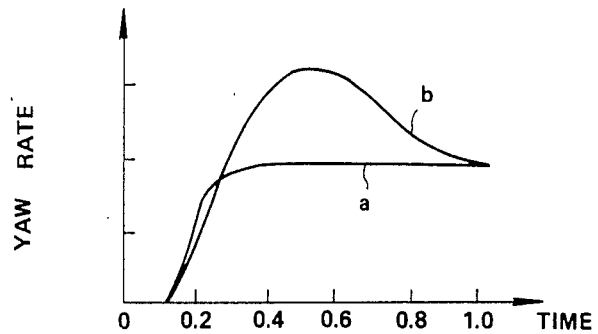

When the steering wheel of the controlled vehicle is turned abruptly as shown in FIG. 11, for example, the yaw rate of the controlled vehicle changes as shown by a line 'a' in FIG. 12. A line 'b' in FIG. 12 shows a response of the yaw rate of a conventional vehicle having no steering control. As evident from FIG. 12, the response obtained by the second embodiment is much closer to the ideal than the conventional example shown by the line 'b'.

Figure 13:
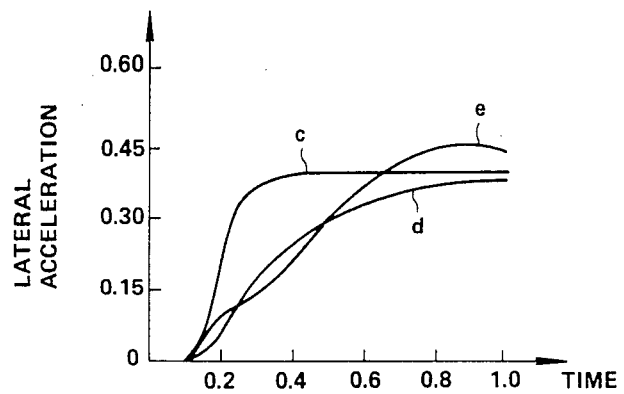

The characteristic as shown by the line 'a' of FIG. 12 can be obtained also by the control system of the first embodiment using a single desired vehicle. However, the control system of the first embodiment cannot improve the response of lateral acceleration to a sufficient extent simultaneously with the response of yaw rate. In FIG. 13, a line 'c' shows a response of lateral acceleration obtained by the second embodiment, a line 'd' shows a response obtained by the first embodiment, and a line 'e' shows a response obtained by a conventional vehicle. The characteristic 'd' of the first embodiment is not oscillatory unlike the characteristic 'e' of the conventional example. However, the characteristic 'd' of the first embodiment is not so sharp as the characteristic 'c' of the second embodiment. In the control system of the first embodiment, the lateral acceleration is adversely influenced by the control in which importance is attached to yaw rate. The control system of the second embodiment can perform a control designed to attach importance to yaw rate, and a control designed to attach importance to lateral acceleration simultaneously, so that the satisfactory response of yaw rate shown by the line 'a' of FIG. 12 and the sharp response of lateral acceleration shown by the line 'c' in FIG. 13 can be obtained simultaneously.

Figure 14:
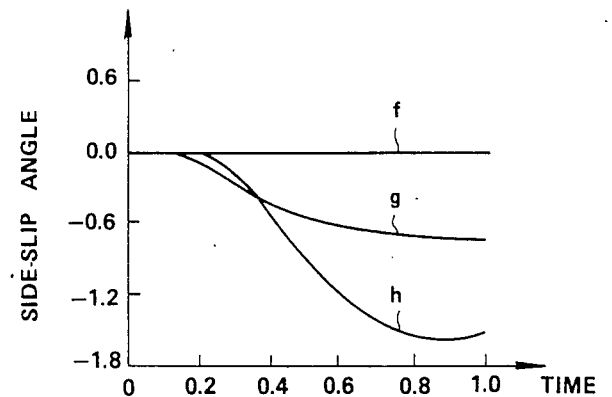

Furthermore, it is possible to control the side slip angle equal to zero as shown by a characteristic 'f' in FIG. 14. Such a control is impossible to achieve not only in a vehicle of the conventional type (as shown by a line 'h') but also in a vehicle having a control system of the first embodiment designed to attach importance to the response of yaw rate.

Figure 15:
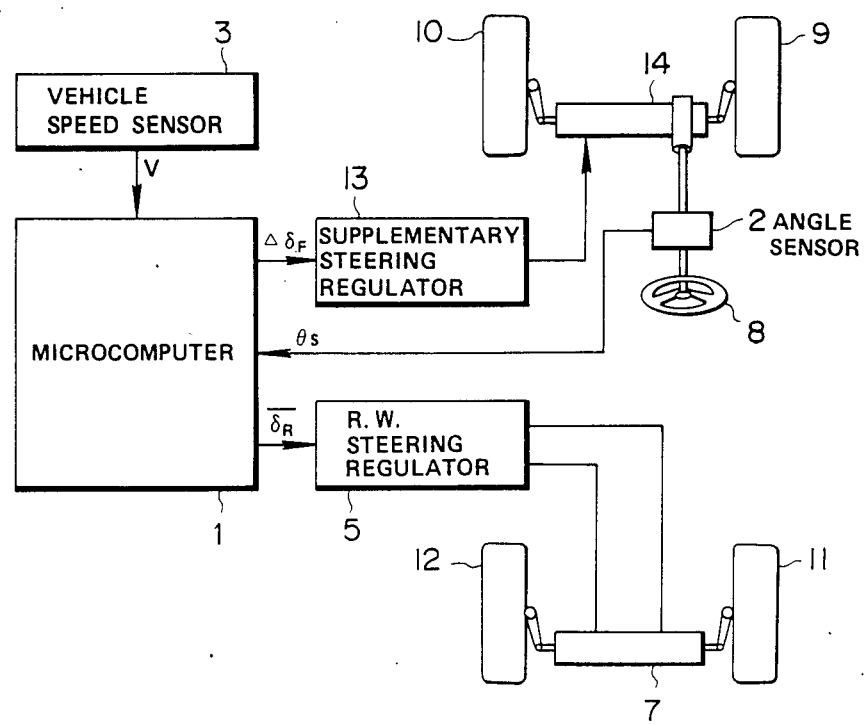
FIG. 15 is schematic view showing a modified arrangement of the control system of the second embodiment.

FIG. 15 shows a modification of the second embodiment. The rear wheel steering system of FIG. 15 is not different from that of the second embodiment. However, in the system of FIG. 15, the front wheels 9 and 10 are steered on one hand by a conventional mechanical steering linkage 14 in accordance with an angular displacement of the steering wheel 8, and on the other hand by a supplementary steering regulator 13 so that the steering angle of the front wheels remains equal to the desired value.

In this case, a correction quantity $\Delta\delta_F$ added by the supplementary steering regulator 13 to a steering quantity determined by the mechanical steering linkage can be determined by using the following equations in place of the equations (36) and (38) at the step 57

$$\beta_{F3} = C_{F3}/eK_{F3} \tag{40}$$

$$\Delta\delta_F = \beta_{F3} + (\dot{y}_3 - L_{F3}\dot{\phi})/V - \frac{\theta_S}{N_3} \tag{41}$$

where
$eK_{F3}$ = a front equivalent cornering power of the controlled vehicle
$N_3$ = an overall steering (gear) ratio of the controlled vehicle The front equivalent cornering power $eK_{F3}$ is given by $$eK_{F3} = \frac{K_{F3}}{1 + \frac{2\xi_3}{N_3^2 K_{S3}} K_{F3}}$$

where
$K_{S3}$ = a steering stiffness of the controlled vehicle, and
$\xi_3$ = a trail of the controlled vehicle.

In this way, the modified control system of FIG. 15 can provide the same effect as the second embodiment.

Figure 16:
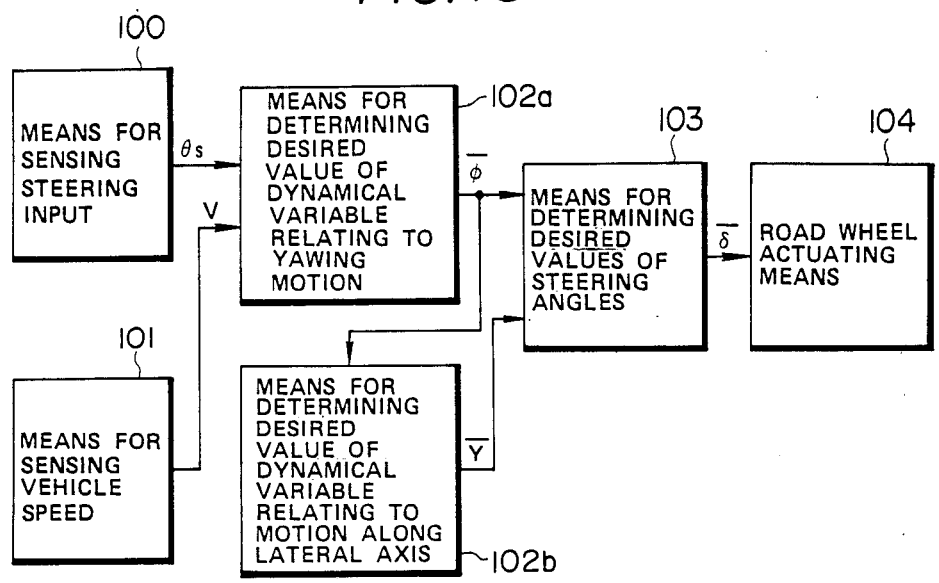
FIG. 16 is a block diagram of a steering control system showing a third embodiment of the present invention.
Figure 17:
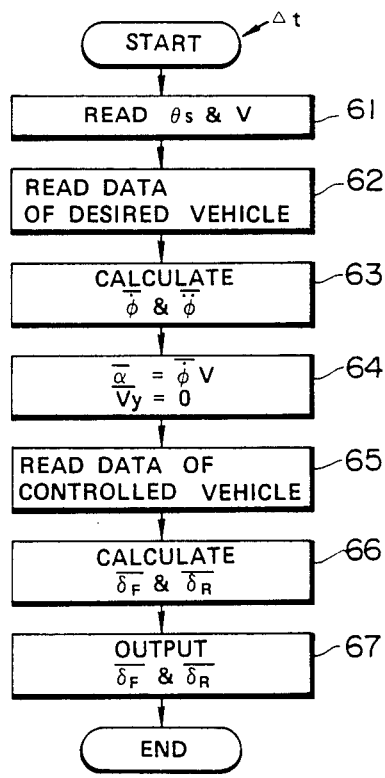
FIG. 17 is a flowchart showing a program used in the third embodiment.

A third embodiment of the present invention is shown in FIGS. 16 and 17. A steering control system of the third embodiment is arranged to hold the side slip angle of the center of gravity of the controlled vehicle always equal to zero.

It is ideal for the directional stability of a vehicle to hold the side slip angle of the center of gravity of the vehicle equal to zero irrespectively of whether the vehicle is in a transient motion or in a steady state motion, and irrespectively of variation of the vehicle speed.

However, in a conventional vehicle, it is impossible to hold the side slip angle always equal to zero for the following reason. The following relations are a solution of the equations of motion to hold the side slip angle always equal to zero, obtained by using approximate linear equations of two degrees of freedom (yaw, and lateral rectilinear motion).

$$\dot{\phi} = k\theta_s \tag{51}$$

$$\alpha = kV\theta_s \tag{52}$$

That is, if the steering input angle is changed from zero to a given angle in a time $\Delta t$, then the yaw rate of a magnitude satisfying the equation 51 must be produced immediately at the end of the time $\Delta t$. Such a characteristic can be obtained with a steering system having no delay of yaw rate or with a vehicle body having a yawing moment of inertia equal to zero, both of which are practically impossible.

As shown in FIG. 16, the steering control system of the third embodiment has a means 102a for determining a desired value of a dynamical variable relating to yaw, similar to the means 102a of the second embodiment, and a means 102b for determining a desired value $\overline{Y}$ of a dynamical variable relating to lateral motion from the desired value of yaw determined by the means 102a so that the side slip angle of the center of gravity of the controlled vehicle can be maintained always equal to zero. The construction of the third embodiment is the same as the constructions of the first and second embodiments shown in FIGS. 2 and 3, except the inside of the microcomputer 1.

FIG. 17 shows a program of the third embodiment. Steps 61–63 are similar to the steps 51–53 of the second embodiment shown in FIG. 10. At a step 64, the CPU of the microcomputer 1 determines a desired value $\overline{\alpha}$ of the lateral acceleration from the desired value $\dot{\phi}$ of the yaw rate determined at the step 63 and the vehicle speed V read at the step 51 in accordance with the following equation.

$$\overline{\alpha} = \dot{\phi}V$$

In this case, $\ddot{y}_1 (= \overline{\alpha} - \dot{\phi}_1 V)$ is equal to zero, and therefore, the integral $y_1$ is also equal to zero. Therefore, the CPU of the microcomputer 1 sets a desired value $\dot{y}$ of the lateral speed equal to zero.

A step 65 is similar to the step 56 of the second embodiment shown in FIG. 10.

At a step 66, the CPU of the microcomputer 1 determines desired value $\overline{\delta}_F$ and $\overline{\delta}_R$ of the front and rear wheel steering angles from the data of the controlled vehicle read at the step 65, the desired values $\dot{\phi}$ and $\ddot{\phi}$ determined at the step 63 and the desired values $\overline{\alpha}$ and $\dot{y}$ determined at the step 64 by using the equations (34)–(39) and an equation expressed as $\dot{y}_3 = \dot{y}$.

A step 67 is similar to the step 58 of the second embodiment.

As a result, the yawing motion of the controlled vehicle is controlled according to the dynamical characteristics of the desired vehicle, and the lateral motion of the controlled vehicle is controlled so that the side slip angle of the center of gravity of the controlled vehicle remains equal to zero. In the third embodiment, $\overline{\alpha} = \dot{\phi}V$ and $\bar{y}=0$. Therefore, an angular velocity $\dot{\beta}$ of the side slip angle of the center of gravity given by $$\dot{\beta} = \frac{\alpha}{V} - \dot{\phi}\left(=\frac{\ddot{y}}{V}\right)$$

is equal to zero, so that the side slip angle $\beta$ which is an integral of the angular velocity $\dot{\beta}$ is equal to zero.

The steering control system of the third embodiment can provide the characteristics shown by the line 'a' of FIG. 12, the line 'c' of FIG. 13, and the line 'f' of FIG. 14.

The third embodiment can be modified in the same manner as described with reference to and shown in FIG. 15.

What is claimed is:

1. A steering control system for a controlled vehicle having a pair of front wheels and a pair of rear wheels, comprising:
    steering input sensing means for sensing a steering input quantity representing a driver's steering command of said controlled vehicle and determining a sensed value of said steering input quantity,
    vehicle speed sensing means for sensing a vehicle speed of said controlled vehicle and determining a sensed value of said vehicle speed,
    target determining means connected with said steering input and vehicle speed sensing means for determining a desired value of at least one dynamic variable corresponding to a response of a desired vehicle to said sensed values of said steering input quantity and said vehicle speed by solving a group of equations of vehicle motion characteristics of said desired vehicle for said desired value of said at least one dynamic variable using a set of vehicle parameters representative of said desired vehicle,
    steering angle determining means connected with said target determining means for determining desired values of front and rear steering angles of said front wheels and said rear wheels required to achieve said desired value of said dynamic variable by solving equations of motion characteristic of said controlled vehicle using said desired value of said dynamic variable and a set of vehicle parameters representative of said controlled vehicle,
    front wheel steering actuating means for steering said front wheels of said controlled vehicle so that the actual front steering angle of said front wheels remains equal to said desired value of said front steering angle,
    rear wheel steering actuating means for steering said rear wheels of said controlled vehicle so that the actual rear steering angle of said rear wheels remains equal to said desired value of said rear steering angle.

2. A steering control system according to claim 1, wherein each set of vehicle parameters comprises a yawing moment of inertia $I_Z$ of a vehicle, a vehicle mass M, a distance $L_F$ between a front axle and a center of gravity of the vehicle, a distance $L_R$ between a rear axle and the center of gravity of the vehicle, an overall steering ratio N, a cornering power $K_F$ of each of front wheels, and a cornering power $K_R$ of each of rear wheels.

3. A steering control system according to claim 2, wherein said group of equations of vehicle motion characteristic of said desired vehicle comprises an equation of lateral motion and an equation of yaw expressed, respectively, as:

$$M(\ddot{y}+\dot{\phi}V)=2C_F+2C_R$$

$$I_Z\ddot{\phi}=2L_FC_F-2L_RC_R$$

where V is the vehicle speed, $\dot{\phi}$ is a yaw rate, $\ddot{\phi}$ is a yaw acceleration, $\ddot{y}$ is a side slipping acceleration, $C_F$ is a cornering force of each of the front wheels, and $C_R$ is a cornering force of each of the rear wheels.

4. A steering control system according to claim 3, wherein said angle determining means uses said equation of lateral motion and said equation of yaw.

5. A steering control system according to claim 4, wherein desired values of yaw rate, the yaw acceleration and a lateral acceleration, are determined by said target determining means.

6. A steering control system according to claim 5, wherein said set of vehicle parameters representing said desired vehicle further comprises a moment of inertia about a kingpin $I_K$, a steering stiffness $K_S$, a viscosity coefficient $D_K$ of a steering system, and a trail $\xi$, and wherein said group of equations characteristic of said desired vehicle further comprises an equation of steering system expressed as follows:

$$I_K\ddot{\delta}_F=NK_S(\theta_S-N\delta_F)-D_K\dot{\delta}_F-2\xi C_F$$

where $\delta_F$ is a steering angle of the front wheels, and $\theta_S$ is the steering input quantity.

7. A steering control system according to claim 6, wherein said target determining means determines desired values of the yaw acceleration and lateral acceleration.

8. A steering control system according to claim 7, wherein said target determining means stores a plurality of sets of vehicle parameters representative of different desired vehicles.

9. A steering control system according to claim 1, wherein said target determining means comprises first target determining means for determining a desired value of yaw, corresponding to said sensed values of the steering input quantity and vehicle speed by using first vehicle parameters representative of a first desired vehicle, and second target determining means for determining a desired value of lateral motion along a vehicle lateral axis by using second vehicle parameters representative of a second desired vehicle, and wherein said angle determining means determines said desired values of said front and rear steering angles by using said desired values determined by said first and second determining means.

10. A steering control system according to claim 9, wherein each of said first and second determining means and said angle determining means uses an equation of lateral motion obtained from a balance of forces acting along the vehicle lateral axis and an equation of yaw obtained from a balance of moment about the yawing axis.

11. A steering control system according to claim 10, wherein said first target determining means determines desired values of the yaw rate and yaw acceleration, and said second target determining means determines a desired value of the lateral acceleration.

12. A steering control system according to claim 11, wherein said front wheel steering actuating means comprises a mechanical steering linkage and a front hydraulic actuator.

13. A steering control system according to claim 1, wherein said target determining means comprises first target determining means for determining a desired value of yaw, corresponding to said sensed values of the steering input quantity and vehicle speed by using first vehicle parameters representative of a first desired vehicle, and second target determining means for determining a desired value of lateral motion along a vehicle lateral axis from said desired value of yaw determined by said first target determining means in accordance with a predetermined relation required to hold a side slip angle of a center of gravity of a vehicle always equal to zero.

14. A steering control system according to claim 13, wherein said first target determining means determines a desired value of the yaw rate, and said second target determining means determines a desired value of the lateral acceleration which is set equal to a product of said desired value of the yaw rate determined by said first target determining means and said sensed value of the vehicle speed sensed by said vehicle speed sensing means.

15. A steering control system according to claim 14, wherein said front wheel steering actuating means comprises a mechanical steering linkage and a front hydraulic actuator.

16. A steering control system according to claim 1 wherein said target determining means solves said group of equations of vehicle motion characteristic of said desired vehicle by performing an integration process to determine an output quantity substantially equal to a time integral of an input quantity during turning movement of said controlled vehicle, and said steering angle determining means solves said group of equations of vehicle motion characteristic of said controlled vehicle by performing an integration process during turning movement of said controlled vehicle.

17. A steering control system according to claim 1 wherein said target determining means solves said group of equations of vehicle motion characteristic of said desired vehicle during steady state turning motions and also during transient state turning motions and said steering angle determining means solves said group of equations of vehicle motion characteristic of said controlled vehicle during steady state turning motions and during transient state turning motions.

* * * * *